US011353952B2

(12) United States Patent
Tornéus et al.

(10) Patent No.: US 11,353,952 B2
(45) Date of Patent: Jun. 7, 2022

(54) CONTROLLING ILLUMINATORS FOR OPTIMAL GLINTS

(71) Applicant: Tobii AB, Danderyd (SE)

(72) Inventors: Daniel Johansson Tornéus, Solna (SE); Andreas Klingström, Sollentuna (SE); Martin Skärbäck, Bandhagen (SE)

(73) Assignee: Tobii AB, Danderyd (SE)

( * ) Notice: Subject to any disclaimer, the term of this patent is extended or adjusted under 35 U.S.C. 154(b) by 267 days.

(21) Appl. No.: 16/200,248

(22) Filed: Nov. 26, 2018

(65) Prior Publication Data

US 2020/0166994 A1    May 28, 2020

(51) Int. Cl.
*G06F 3/01* (2006.01)
*G06F 3/038* (2013.01)

(52) U.S. Cl.
CPC .............. *G06F 3/013* (2013.01); *G06F 3/038* (2013.01)

(58) Field of Classification Search
CPC combination set(s) only.
See application file for complete search history.

(56) References Cited

U.S. PATENT DOCUMENTS

| 5,844,544 | A  | 12/1998 | Kahn et al.     |
|-----------|----|---------|-----------------|
| 6,204,828 | B1 | 3/2001  | Amir            |
| 6,351,273 | B1 | 2/2002  | Lemelson et al. |
| 7,113,170 | B2 | 9/2006  | Lauper          |
| 7,164,423 | B1 | 1/2007  | Westen          |
| 7,952,535 | B2 | 5/2011  | Watanabe et al. |
| 8,228,315 | B1 | 7/2012  | Starner et al.  |
| 8,386,928 | B1 | 2/2013  | Asch et al.     |

(Continued)

FOREIGN PATENT DOCUMENTS

| EP | 2670482    |    | 12/2013 |
|----|------------|----|---------|
| EP | 3353631    | A1 | 8/2018  |

(Continued)

OTHER PUBLICATIONS

Daugman, J.G., "High Confidence Visual Recognition of persons by a Test of Statistical Independence", IEEE Transactions on Pattern Analysis and Machine Intelligence, vol. 15, No. 11, Nov. 1993, pp. 1148-1161, 14 pages.

(Continued)

*Primary Examiner* — Roberto W Flores
(74) *Attorney, Agent, or Firm* — Samuel Yamron

(57) ABSTRACT

Techniques for controlling light sources used in eye tracking are described. In an example, an eye tracking system generates a first image and a second image showing at least a portion of the user eye illuminated by a predetermined set of illuminators of the eye tracking system. The eye tracking system determines a first position of a glint in the first image and a second position of the glint in the second image. Each of the first position and the second position is relative to a pupil edge. The eye tracking system predicts a third position of the glint relative to the pupil edge based on the first position and the second position. Further, the eye tracking system determines, from the predetermined set, an illuminator that corresponds to the glint and determines, based on the third position, whether to power off the illuminator to generate a third image of at least the portion of the user eye.

18 Claims, 8 Drawing Sheets

(56) References Cited

U.S. PATENT DOCUMENTS

| | | |
|---|---|---|
| 8,643,951 B1 | 2/2014 | Wheeler et al. |
| 8,793,620 B2 | 7/2014 | Stafford |
| 8,971,570 B1 | 3/2015 | Raffle et al. |
| 9,041,787 B2 | 5/2015 | Andersson et al. |
| 9,069,164 B2 | 6/2015 | Starner et al. |
| 9,201,578 B2 | 12/2015 | Scott et al. |
| 9,442,567 B2 | 9/2016 | Scott et al. |
| 9,507,418 B2 | 11/2016 | Yu et al. |
| 9,619,020 B2 | 4/2017 | George-Svahn |
| 9,778,814 B2 | 10/2017 | Ambrus et al. |
| 9,804,671 B2 | 10/2017 | Taguchi et al. |
| 9,830,513 B2 | 11/2017 | Gustafsson et al. |
| 9,958,941 B2 | 5/2018 | Gustafsson et al. |
| 9,977,960 B2 | 5/2018 | Gustafsson et al. |
| 2001/0034218 A1 | 10/2001 | Hudecek et al. |
| 2002/0175897 A1 | 11/2002 | Pelosi |
| 2004/0108971 A1 | 6/2004 | Waldern et al. |
| 2004/0252277 A1 | 12/2004 | Chielewski et al. |
| 2005/0243054 A1 | 11/2005 | Beymer et al. |
| 2006/0069458 A1 | 3/2006 | Lee et al. |
| 2010/0220291 A1 | 9/2010 | Horning |
| 2010/0309432 A1 | 12/2010 | Suzuki et al. |
| 2010/0328444 A1 | 12/2010 | Blixt et al. |
| 2011/0032365 A1 | 2/2011 | Yett |
| 2011/0150334 A1* | 6/2011 | Du .............. G06K 9/00604 382/173 |
| 2011/0175932 A1 | 7/2011 | Yu et al. |
| 2012/0188148 A1 | 7/2012 | DeJong |
| 2012/0272179 A1 | 10/2012 | Stafford |
| 2012/0274745 A1 | 11/2012 | Russell |
| 2013/0016070 A1 | 1/2013 | Starner et al. |
| 2013/0021373 A1 | 1/2013 | Vaught et al. |
| 2013/0050432 A1 | 2/2013 | Perez et al. |
| 2013/0050833 A1 | 2/2013 | Lewis et al. |
| 2013/0083003 A1 | 4/2013 | Perez |
| 2013/0114850 A1 | 5/2013 | Publicover et al. |
| 2013/0169560 A1 | 7/2013 | Cederlund et al. |
| 2013/0228804 A1 | 9/2013 | Yan |
| 2013/0300636 A1 | 11/2013 | Cunningham et al. |
| 2013/0328762 A1 | 12/2013 | McCulloch et al. |
| 2014/0184550 A1 | 7/2014 | Hennessey et al. |
| 2014/0247232 A1 | 9/2014 | George-Svahn et al. |
| 2014/0300538 A1 | 10/2014 | Rijnders |
| 2014/0306891 A1 | 10/2014 | Latta et al. |
| 2014/0347623 A1 | 11/2014 | Inoue et al. |
| 2015/0002542 A1 | 1/2015 | Chan et al. |
| 2015/0042558 A1 | 2/2015 | Massonneau et al. |
| 2015/0061996 A1 | 3/2015 | Gustafsson et al. |
| 2015/0062322 A1 | 3/2015 | Gustafsson et al. |
| 2015/0070654 A1 | 3/2015 | Brown, Jr. et al. |
| 2015/0103018 A1 | 4/2015 | Kamin-Lyndgaard et al. |
| 2015/0130714 A1 | 5/2015 | Onuki |
| 2015/0130740 A1 | 5/2015 | Cederlund et al. |
| 2015/0138073 A1 | 5/2015 | Hennelly |
| 2015/0138079 A1 | 5/2015 | Lannsjö |
| 2015/0138244 A1 | 5/2015 | George-Svahn et al. |
| 2015/0143293 A1 | 5/2015 | George-Svahn et al. |
| 2015/0149956 A1 | 5/2015 | Kempinski et al. |
| 2015/0193018 A1 | 7/2015 | Venable et al. |
| 2015/0205494 A1 | 7/2015 | Scott et al. |
| 2015/0219899 A1 | 8/2015 | Mack et al. |
| 2015/0261008 A1 | 9/2015 | Fujii et al. |
| 2015/0268799 A1 | 9/2015 | Starner et al. |
| 2015/0278576 A1* | 10/2015 | Horesh .............. G06V 10/40 382/103 |
| 2015/0301592 A1 | 10/2015 | Miller |
| 2015/0331240 A1 | 11/2015 | Poulos et al. |
| 2015/0340223 A1 | 11/2015 | Wunderer |
| 2015/0346810 A1 | 12/2015 | Urbach |
| 2016/0048204 A1 | 2/2016 | Scott et al. |
| 2016/0081547 A1 | 3/2016 | Gramatikov et al. |
| 2016/0085286 A1* | 3/2016 | Zhou .............. G06F 3/017 345/156 |
| 2016/0179336 A1 | 6/2016 | Ambrus et al. |
| 2016/0189430 A1 | 6/2016 | Kuehne |
| 2016/0191576 A1 | 6/2016 | Thompson et al. |
| 2016/0320625 A1 | 11/2016 | Von et al. |
| 2017/0075420 A1 | 3/2017 | Yu et al. |
| 2017/0090562 A1 | 3/2017 | Gustafsson et al. |
| 2017/0090563 A1 | 3/2017 | Gustafsson et al. |
| 2017/0090564 A1 | 3/2017 | Gustafsson et al. |
| 2017/0090566 A1 | 3/2017 | George-Svahn et al. |
| 2017/0091549 A1 | 3/2017 | Gustafsson et al. |
| 2017/0177078 A1 | 6/2017 | Henderek et al. |
| 2017/0177079 A1 | 6/2017 | George-Svahn et al. |
| 2017/0316264 A1 | 11/2017 | Gustafsson et al. |
| 2019/0042842 A1* | 2/2019 | Cavin .............. G06T 7/74 |

FOREIGN PATENT DOCUMENTS

| | | |
|---|---|---|
| EP | 3353632 A1 | 8/2018 |
| JP | 2010017407 | 1/2010 |
| WO | 2006111744 | 10/2006 |
| WO | 2017053966 | 3/2017 |
| WO | 2017053971 | 3/2017 |
| WO | 2017053972 | 3/2017 |
| WO | 2017053974 | 3/2017 |

OTHER PUBLICATIONS

Guestrin, et al., "General Theory of Remote Gaze Estimation Using the Pupil Center and Corneal Reflections", Biomedical Engineering, IEEE Transactions, vol. 53, No. 6, pp. 1124-1133, Jun. 2006, 9 pages.

Hamamatsu, Profile Sensor S9132 High speed frame rate sensor capable of acquiring two-dimensional projection data, Jan. 2014, pp. 1-10.

Hillaire, et al., "Using an Eye-Tracking System to Improve Camera Motions and Depth-of-Field Blur Effects in Virtual Environments," 2008, Virtual Reality Conference, 4 pages.

Karitans et al., Method for Compensation of Eye Movements in Adaptive Optics, Latvian Journal of Physics and Technical Sciences vol. 47, No. 3, Jan. 1, 2010, pp. 51-56.

Littlewort-Ford, et al., "Are your eyes smiling? Detecting Genuine Smiles with Support Vector Machines and Gabor Wavelets," Proceedings of the 8$^{th}$ Joint Symposium on Neural Computation, 2001, 9 pages.

Non-Final Office Action dated Dec. 13, 2018 in related U.S. Appl. No. 16/162,223, 15 pgs.

Notice of Allowance dated Apr. 1, 2019 in related U.S. Appl. No. 16/162,223, 12 pgs.

Final Office Action dated Feb. 7, 2019 in related U.S. Appl. No. 15/276,618, 14 pgs.

Non-Final Office Action dated May 17, 2019 in related U.S. Appl. No. 15/983,772.

Final Office Action dated May 30, 2019 in related U.S. Appl. No. 15/651,976, 18 pgs.

Notice of Decision to Grant dated Apr. 1, 2020 in related foreign application No. KR 10-2018-7011089, all pgs.

Non-Final Office Action dated Oct. 1, 2019 in related U.S. Appl. No. 16/097,588, all pgs.

Office Action dated Oct. 22, 2019 in related foreign application No. KR 10-2018-7011109, all pgs.

Office Action dated Oct. 22, 2019 in related foreign application No. KR 10-2018-7011089, all pgs.

Office Action dated Oct. 22, 2019 in related foreign application No. KR-10-2018-7011088, all pgs.

Notice of Allowance dated Nov. 20, 2019 in related U.S. Appl. No. 15/926,722, all pgs.

International Preliminary Report on Patentability dated Jan. 30, 2020 in related application No. PCT/US2018/042443, all pgs.

* cited by examiner

CONTROLLING ILLUMINATORS FOR OPTIMAL GLINTS

BACKGROUND

Interaction with computing devices is a fundamental action in today's world. Computing devices, such as personal computers, tablets, and smartphones, are found throughout daily life. In addition, computing devices that are wearable, such as wearable headset devices (e.g., virtual reality (VR) headsets and augmented reality (AR) headsets), are becoming increasingly popular. The systems and methods for interacting with such devices define how they are used and what they are used for.

Advances in eye tracking technology have made it possible to interact with a computing device using a person's gaze information, such as the position on a display the user is gazing at. This information can be used for interaction solely, or in combination with a contact-based interaction technique (e.g., using a user input device, such as a keyboard, a mouse, a touch screen, or another input/output interface).

Previously proposed interaction techniques using gaze information can be found in U.S. Pat. No. 6,204,828, United States Patent Application Publication 2013/0169560, U.S. Pat. No. 7,113,170, United States Patent Application Publication 2014/0247232, and U.S. Pat. No. 9,619,020. The full specification of these patents and applications are herein incorporated by reference.

In computing devices, such as wearable devices, images of an eye may be generated and processed to detect the pupil and glints and, thereby, track the eye. In many implementations, a light source, such as one including a light emitting diode (LED), is powered on to illuminate the eye and for the imaging.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

SUMMARY

Figure 1:
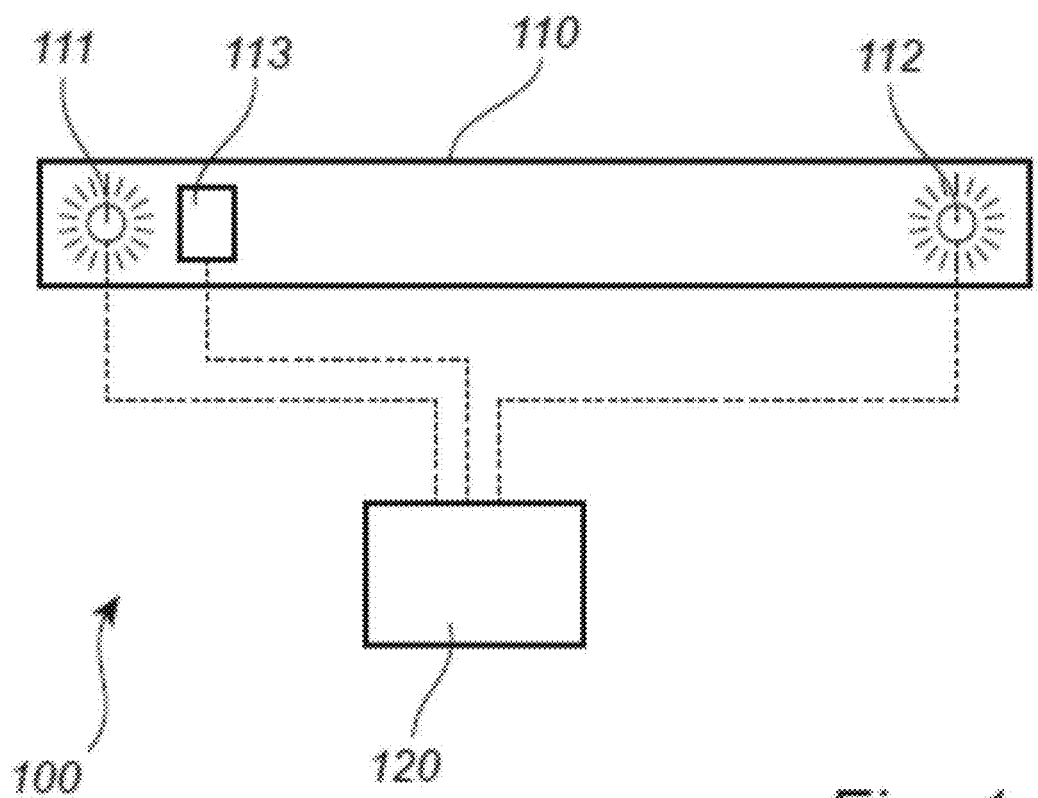
FIG. 1 illustrates an eye tracking system, according to an embodiment of the present disclosure.

Embodiments for controlling light sources used in eye tracking are disclosed. In an example, an eye tracking system determines directly in consecutive two-dimensional images whether glints are about to fall on a pupil edge without knowledge of a three dimensional position of a cornea center. If one or more glints satisfy this condition, illuminators associated with these glints are powered off and at least a next image is generated with these illuminators in the power off state.

In particular, the eye tracking system generates multiple images showing at least a portion of the user eye illuminated by a predetermined set of illuminators of the eye tracking system. For some or all of the glints, the eye tracking system determines positions in the images of each of such glints. These positions can be relative to a pupil edge. For each of such glints, the eye tracking system also predicts a next position of the glint relative to the pupil edge based on the positions determined for the glint. Further, and for each of such glints, the eye tracking system determines, from the predetermined set, an illuminator that corresponds to the glint and determines, based on the glint's next position, whether to power off the illuminator to generate a an additional image, where this additional image is further used for the eye tracking.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

DETAILED DESCRIPTION

Embodiments of the present disclosure relate to, among other things, controlling light sources used for eye tracking. In an example, multiple light sources are used to illuminate an eye of a user. These light sources are referred to herein as illuminators. A predetermined set of the light sources may be powered on and multiple images are generated, each showing at least a portion of the eye. The images are processed to identify glints and the pupil edge, where each glint corresponds to a reflection from the eye of light emitted from a light source. Positions of the glints relative to the pupil edge in each image are determined and these positions over the different images are used to predict the next glint positions. If a glint is about to fall on the pupil edge or is close to the pupil edge by a certain threshold distance, the corresponding light source is selected and powered off. This approach of predictively identifying glints moving to or beyond the pupil edge and selectively powering off light sources provide many technical advantages over existing eye tracking systems.

In particular, a wearable computing device such as a VR or AR headset, may integrate an eye tracking system that uses multiple illuminators for each user eye. Different techniques are possible to use the illuminators for the eye tracking. In one prior art technique, all illuminators are powered on, thereby resulting in a large number of glints on the user eye. However, this technique may have multiple drawbacks. For example, some of the glints may occur on the pupil edge and, thus, may obstruct the pupil edge and degrade the accuracy of the eye tracking because the pupil edge may not be accurately detected. In addition, the eye tracking may also involve mapping the glints to the illuminators. However, with a large number of glints and, equivalently, illuminators, the complexity of the eye tracking increases, potentially resulting in processing latency. In another technique, a subset of the illuminators is turned on, thereby saving power consumption and generally improving the accuracy. However, this technique generally involves determining a three dimensional position of the cornea center, which can add complexity and increase the processing latency.

In comparison, embodiments of the present disclosure involve selectively powering on and off illuminators (e.g., subsets of the available light sources), thereby saving power consumption and improving the accuracy. To reduce the complexity and improve the processing latency, the embodiments also involve predicting the positions of the glints using two dimensional images without the need to determine the three dimensional position of the cornea center.

FIG. 1 shows an eye tracking system 100 (which may also be referred to as a gaze tracking system), according to an embodiment. The system 100 comprises illuminators 111 and 112 for illuminating the eyes of a user, and an image sensor 113 for capturing images of the eyes of the user. The illuminators 111 and 112 may for example, be light emitting diodes emitting light in the infrared frequency band, or in the near infrared frequency band. The image sensor 113 may for example be a camera, such as a complementary metal oxide semiconductor (CMOS) camera or a charged coupled device (CCD) camera. The camera is not limited to be an IR camera, a depth camera, or a light-field camera. The shutter mechanism of the image sensor 113 can be either a rolling shutter or a global shutter.

A first illuminator 111 is arranged coaxially with (or close to) the image sensor 113 so that the image sensor 113 may capture bright pupil images of the user's eyes. Due to the coaxial arrangement of the first illuminator 111 and the image sensor 113, light reflected from the retina of an eye returns back out through the pupil towards the image sensor 113, so that the pupil appears brighter than the iris surrounding it in images where the first illuminator 111 illuminates the eye. A second illuminator 112 is arranged non-coaxially with (or further away from) the image sensor 113 for capturing dark pupil images. Due to the non-coaxial arrangement of the second illuminator 112 and the image sensor 113, light reflected from the retina of an eye does not reach the image sensor 113 and the pupil appears darker than the iris surrounding it in images where the second illuminator 112 illuminates the eye. The illuminators 111 and 112 may for example, take turns to illuminate the eye, so that every first image is a bright pupil (BP) image, and every second image is a dark pupil (DP) image.

The eye tracking system 100 also comprises circuitry 120 (for example including one or more processors) for processing the images captured by the image sensor 113. The circuitry 120 may for example, be connected to the image sensor 113 and the illuminators 111 and 112 via a wired or a wireless connection. In another example, circuitry 120 in the form of one or more processors may be provided in one or more stacked layers below the light sensitive surface of the image sensor 113.

Figure 2:
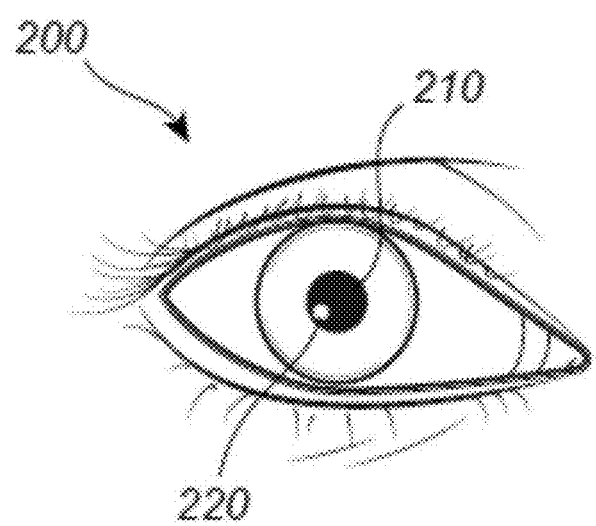
FIG. 2 illustrates an example of an image of an eye captured by an image sensor, according to an embodiment of the present disclosure.

FIG. 2 shows an example of an image of an eye 200, captured by the image sensor 113. The circuitry 120 may for example, employ image processing (such as digital image processing) for extracting features in the image. The circuitry 120 may for example employ pupil center cornea reflection (PCCR) eye tracking to determine where the eye 200 is looking. In PCCR eye tracking, the processor 120 estimates the position of the center of the pupil 210 and the position of the center of a glint 220 at the eye 200. The glint 220 is caused by reflection of light from one of the illuminators 111 and 112. The processor 120 calculates where the user is in space using the glint 220 and where the user's eye 200 is pointing using the pupil 210. Since there is typically an offset between the optical center of the eye 200 and the fovea, the processor 120 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the embodiment described with reference to FIG. 1, the illuminators 111 and 112 are arranged in an eye tracking module 110 placed below a display watched by the user. This arrangement serves only as an example. It will be appreciated that more or less any number of illuminators 111 and 112 and image sensors 113 may be employed for eye tracking, and that such illuminators 111 and 112 and image sensors 113 may be distributed in many different ways relative to displays watched by the user. It will be appreciated that the eye tracking scheme described in the present disclosure may, for example, be employed for remote eye tracking (for example in a personal computer, a smart phone, or integrated in a vehicle) or for wearable eye tracking (such as in virtual reality glasses or augmented reality glasses).

Figure 3:
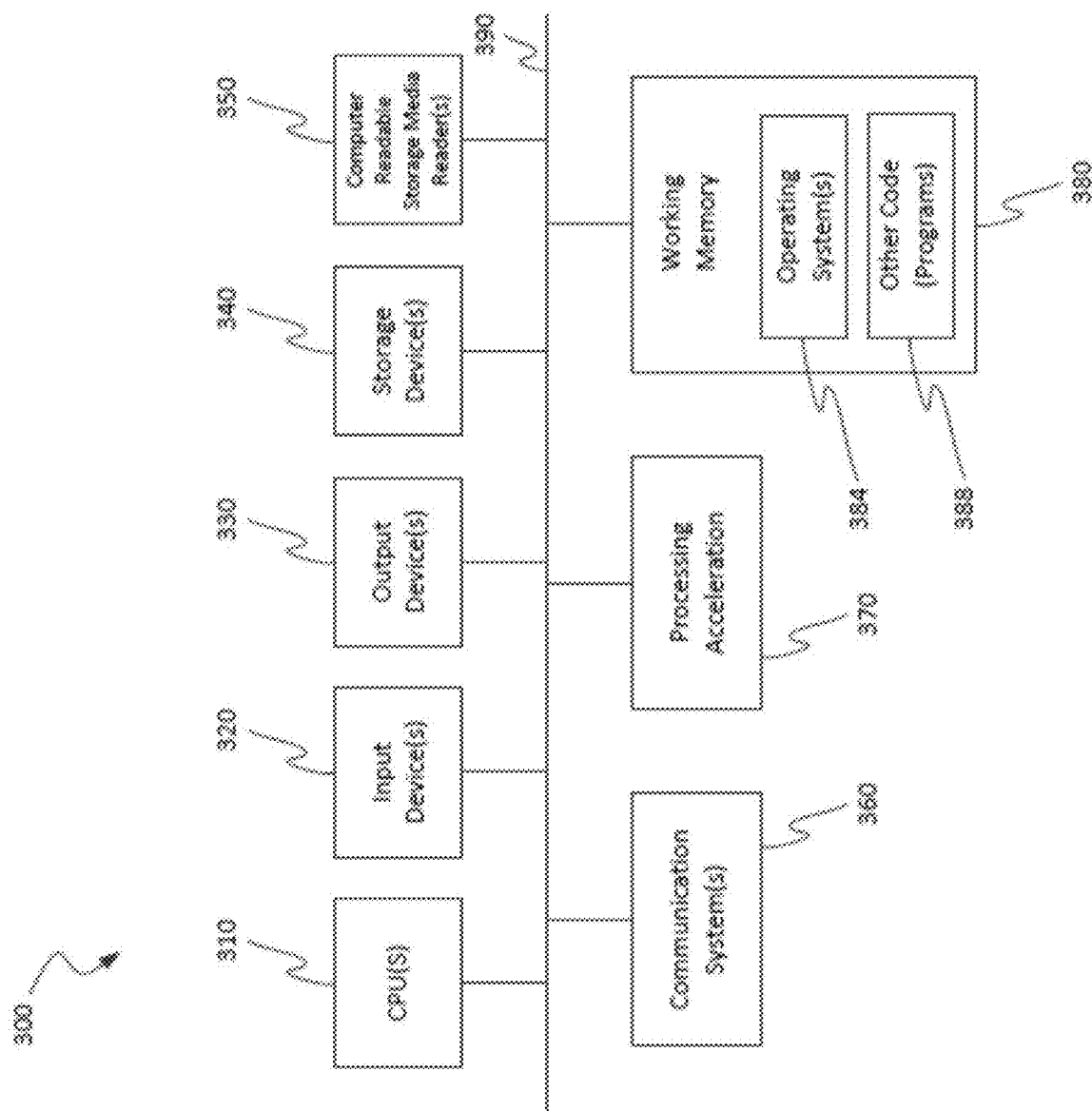
FIG. 3 illustrates a block diagram of a specialized computer system, according to an embodiment of the present disclosure.

FIG. 3 is a block diagram illustrating a specialized computer system 300 in which embodiments of the present disclosure may be implemented. This example illustrates a specialized computer system 300 such as may be used, in whole, in part, or with various modifications, to provide the functions of components described herein.

Specialized computer system 300 is shown comprising hardware elements that may be electrically coupled via a bus 390. The hardware elements may include one or more central processing units 310, one or more input devices 320 (e.g., a mouse, a keyboard, eye tracking device, etc.), and one or more output devices 330 (e.g., a display device, a printer, etc.). Specialized computer system 300 may also include one or more storage devices 340. By way of example, storage device(s) 340 may be disk drives, optical storage devices, solid-state storage devices such as a random access memory ("RAM") and/or a read-only memory ("ROM"), which can be programmable, flash-updateable and/or the like.

Specialized computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, specialized computer system 300 may also include a processing acceleration unit 370, which can include a digital signal processor, a special-purpose processor and/or the like.

Figure 4:
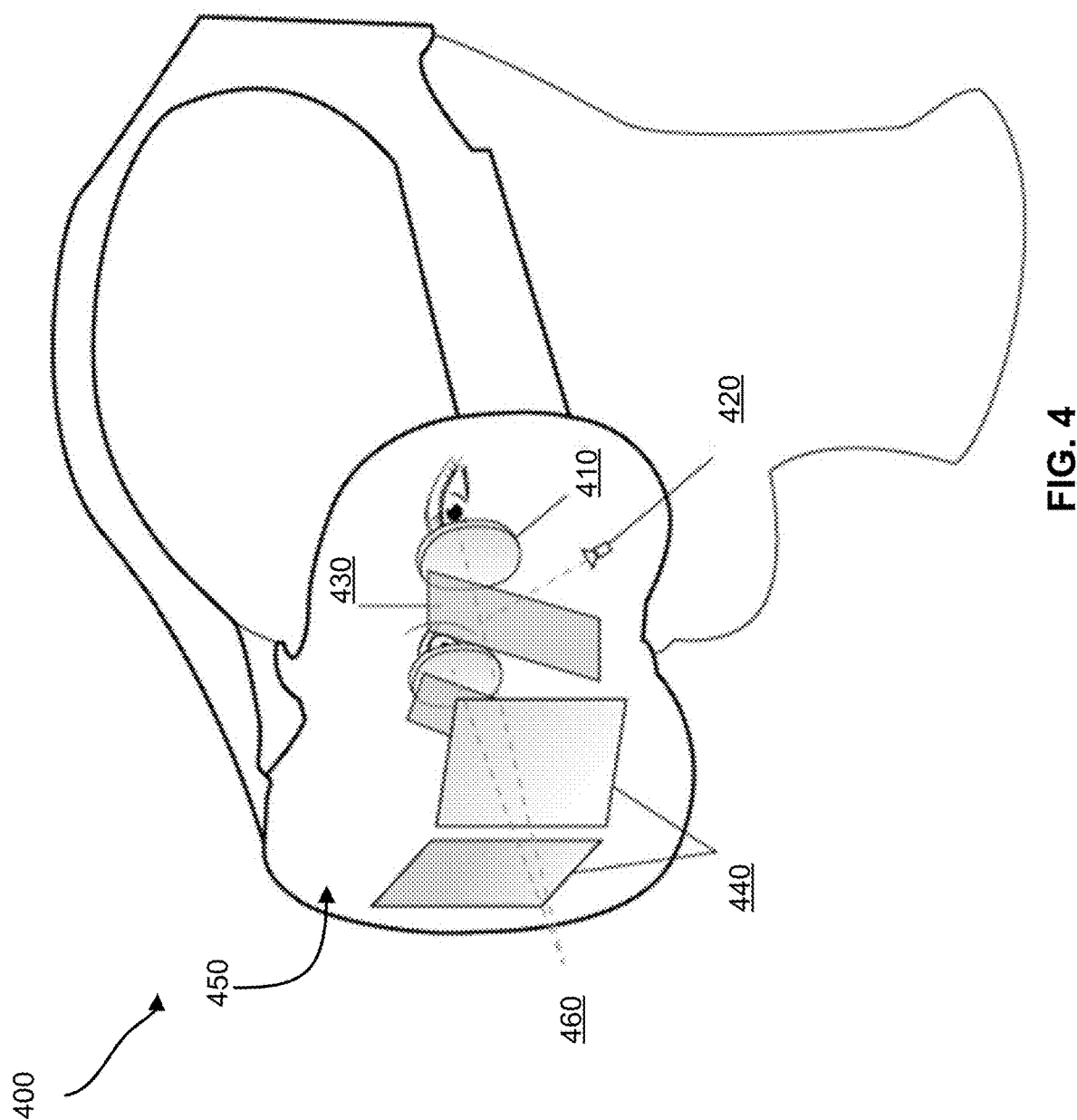
FIG. 4 illustrates an example of a wearable computing device that implements components of an eye tracking system, according to an embodiment of the present disclosure.

FIG. 4 shows an example of a wearable computing device 400 that implements some or all of the above components of an eye tracking system 100 as described in connection with FIGS. 1-2. The wearable computing device 400 can be a VR headset or an AR headset that can be worn by a user. As illustrated, the wearable computing device 400 includes a set of lenses 410, such as Fresnel lenses, a set of cameras 420, a set of hot mirrors 430, and a set of displays 440. The camera 420 can include the image sensors 113 of FIG. 1. Although not shown in FIG. 4, the wearable computing device 400 can also include a set of illuminators and processing circuitry. These and other components can be integrated within a housing 450 of the wearable computing device 400. In this way, upon the user mounting the wearable computing device 400 on his or her head, the set of lenses 410 would be relatively close to the user's eyes and the set of displays would be relatively far from the user's eye, and the remaining components may be located in between. The arrangement of these components allows the detection of the user's gaze point in three-dimensional virtual or real space.

Figure 5A:
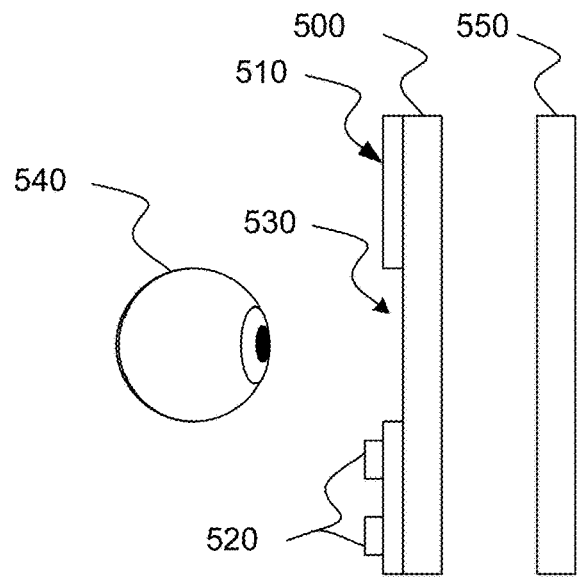
FIGS. 5A, 5B, and 5C illustrate examples of multiple light sources used to illuminate an eye, according to an embodiment of the present disclosure.

FIG. 5A illustrates an example of multiple light sources used to illuminate an eye, according to an embodiment of the present disclosure. In this embodiment, a wearable computing device may include the light sources and hot mirrors (e.g., similar to the hot mirrors 430 of FIG. 4), among other components as described herein next. Generally, multiple illuminators may be for tracking the gaze per user eye. These illuminators may be distributed at known locations within an eye tracking system. Further, the eye tracking system can selectively control the power to some or all of the illuminators, thereby powering them on or off to produce glints suitable for accurate eye tracking with improved latency and power consumption. Within the context of a wearable computing device that includes, for instance a lens, illuminators may be mounted on or within the lens according to a desired installation pattern. Additionally or alternatively, illuminators can be mounted around an edge (e.g., the bezel) of a display at according to the desired pattern. Of course other installation locations are possible. The eye tracking system may include a set of power sources, a set of switches, a set of controllers, a set of wiring, and other components to control the power state of the illuminators.

As illustrated in FIG. 5A, a lens 500 is provided in a wearable computing device. The lens 500 is positioned such that a wearer of the device may view a display 550 through the lens 500. Fixed on, inside, or below the lens 500 is a hot mirror coating or film 510, and fixed on, inside, or below the hot mirror film 510 are multiple illuminators 520. Each of the illuminators 520 may be individually controllable (e.g., powered on and off) and, collectively, the illuminators 520 may form a matrix. The film 510 has a cut-out portion 530 towards the center of the lens 500 to allow an eye tracking camera to view through the lens 500.

The hot mirror coating or film 510 may be applied directly onto the lens 500, or for ease of manufacturing, the hot mirror coating or film 510 may also be in the form of a separate piece which does not function as a lens. Further, and also for ease of manufacturing, a separate piece of glass or plastic may be placed atop the hot mirror, and the illuminators 520 may be affixed to this separate piece.

In an example, the number of illuminators 520 is between twenty and fifty. Each of the illuminators 520 may include an LED light on a chip of about 200 μm×200 μm. The illuminators 520 may emit infrared or near infrared light outwardly towards the eye of a wearer 540, and then reflected by the eye of the wearer back towards the lens 500. The film 510 has the properties of a hot mirror. In other words, the film 510 allows light in the visible spectrum to pass while preventing light in the infrared spectrum from passing. In this way, visible light emitted by a display 550 behind the lens 500 may pass to the wearer's eye, while most infrared light is prevented from passing.

An image sensor located behind the lens, and looking through the cut-out portion 530, captures images of the wearer's eye containing reflections of the infrared light emitted by the illuminators 520, a processing device connected to the image sensor then analyzes those images to determine a direction of the gaze of the user based on the reflections of the infrared light.

The illuminators 520 may be applied to the film 510 in multiple ways, firstly simply through glue or alternatively a possible application is by printing electronics directly onto the film 510. The illuminators 520 will further have to have communication lines applied to the film 510 such that the illuminators may receive power so as to be turned on and off.

In an example, the wearable device includes two lenses 500 with associated film 510 and illuminators 520. The film 510 may be applied to the lens through glue or some other semi-permanent substance. In a system with two lenses, light may reflect from the skin of a user into the lenses, whereby the lenses have a waveguide effect and channel the light away from the wearable device. The presence of the hot mirror 510 acts to lessen the emergence of this light.

In another example, the illuminators 520 may be placed on the side of the lens 500 (or additional pieces as previously described). Illumination from the illuminators 520 may then travel through the lens 500 to be emitted in front of the users eyes. This guiding of the light occurs in an area of the lens where the hot mirror 510 has been applied, so as to prevent illumination from being emitted towards the display 550.

Furthermore, an angled hot mirror 510 may be added in front of the display 550, and the image sensor arranged to view the hot mirror. The lens 500 is then placed in front of a user's eye with illuminators 520 located adjacent thereto. The illuminators 520 illuminate the user's eye, and due to the lens 500 having a hot mirror film or coating, as has been previously described, stray illumination from the illuminators 520 is lessened. A cutout in the hot mirror film or coating allows the image sensor to capture images of the user's eye through the angled hot mirror.

In another example, instead of using the hot mirrors 430 of FIG. 4, the wearable computing device includes holographic optical elements (HOE), such as coatings or films. A HOE is preferably placed between the eye and the display of the wearable device (e.g., the display 440 of FIG. 4) or a viewing plane displaying a projection of an image to the eye of a user. In this example, the camera (e.g., the camera 420 of FIG. 4) is adapted to capture an image of the HOE, and the HOE is adapted to direct at last a first portion of incident light reflected from the eye, in a first angle towards the camera. This first angle is different from an angle of the incidence of the incident light.

The viewing plane is the plane in which the image that the user is watching is placed. The hologram of the HOE does not need to be placed directly on the viewing plane of the user. Especially for VR headsets, a lens may be placed between the eye and the screen that places a virtual image on a comfortable distance a few meters away. In that case the HOE may be placed on the lens.

In AR devices a projector may be placed at the side of the HOE or a prism so that the projector beam is directed towards the eye. The HOE should then be placed between any physical components and the eye.

Figure 5B:
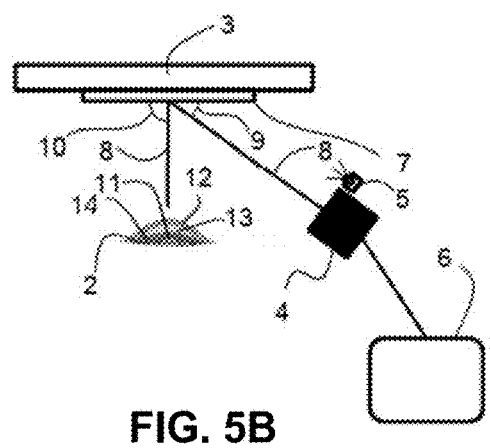

FIG. 5B shows an eye tracking device 1 for tracking movements of an eye 2 comprising, a viewing plane 3 for displaying a projection of an image to the eye 2 of a user, according to according to an embodiment of the present disclosure. An image 4 module is placed on a same side of the viewing plane as the eye 2. At least one illuminator 5 is provided for illuminating the eye 2, and a control unit adapted to receive an image captured by the camera and calculate a viewing angle of the eye is provided connected to the camera 4. A holographic optical element HOE 7 is placed between the eye 2 and the viewing plane 3. In an example, the camera is adapted to capture an image of the HOE 7, and the HOE 7 is adapted to direct at last a first portion 8 of incident light reflected from the eye, in a first angle 9 towards the camera. In this example, the first angle 9 is different from an angle of the incidence 10 of the incident light. The illuminator 5 may be placed adjacent to the camera, illuminating the eye 2 via the HOE 7, as shown in FIG. 5B, or the illuminator 5 may be placed next to the HOE 7 illuminating the eye directly.

In some examples, the first HOE is adapted to direct a second portion of incident light reflected from the eye in a second angle towards the camera. This will split the image perceived by the camera into two overlapped images. This enables stereo imaging by separating the overlapped images using image analysis so that the depth of objects in the image can be determined.

Figure 5C:
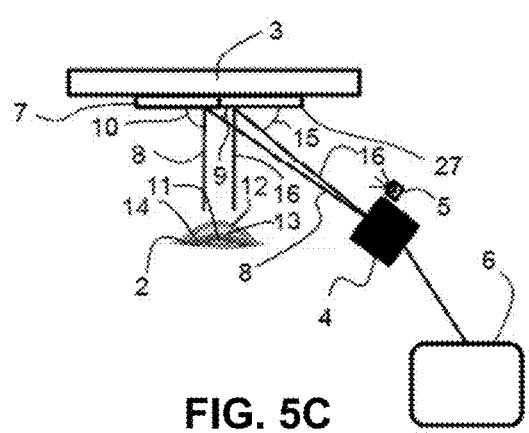

FIG. 5C shows an embodiment of the present disclosure, where a first illuminator 5 is placed adjacent to the camera 4 and where the eye tracking device includes a first HOE 7 and a second HOE 27 placed adjacent to each other on the substrate 3. The first HOE 7 direct light from the illuminator reflected in the eye in a first angle 9 towards the camera and the second HOE 27 direct light from the illuminator reflected in the eye in a second angle 15 towards the camera.

Figure 6:
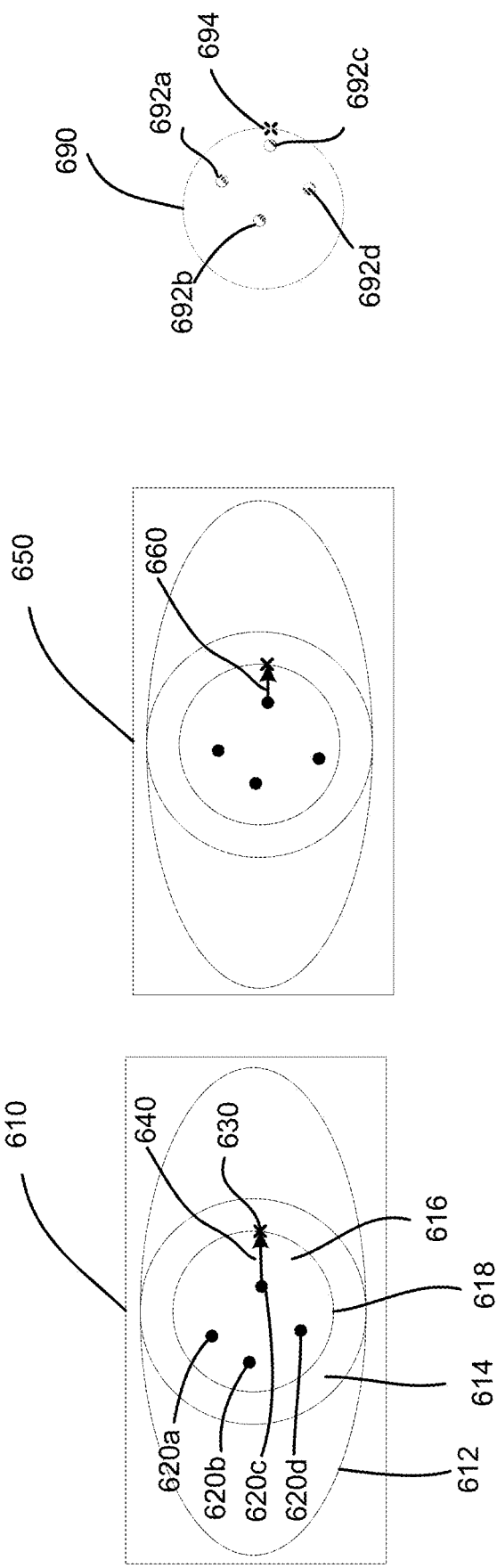
FIG. 6 illustrates an example of images usable to detect glint and pupil edge, according to an embodiment of the present disclosure.

FIG. 6 illustrates an example of images usable to detect glint and pupil edge, according to an embodiment of the present disclosure. A set of illuminators may be powered on and multiple images may be captured over time, while these illuminators are in the power on state. Each of the images shows at least a portion of a user eye including the pupil and glints. Each glint corresponds to one of the powered on illuminators. For each glint, its position relative to the edge of the pupil (e.g., the pupil edge) can be tracked from the images over time. This tracking is used to predict whether the glint is about to fall on the pupil edge or move close to the pupil edge within a threshold. If the predicted position of a glint meets any of these conditions, the corresponding illuminator may be identified and powered off. Accordingly and over time, different illuminators are selected and powered off. To maintain accurate eye tracking, upon powering off one or more illuminators, one or more other illuminators may be powered on. In particular, a determination can be made for the minimal acceptable set of powered on illuminators for eye tracking.

As illustrated, a first image 610 and a second image 650 are generated at different points in time, with a same set of illuminators being powered on for both images 610 and 650. The first image 610 shows a user eye 612, including the iris 614, the pupil 616, the pupil edge 618, and glints 620*a*, 620*b*, 620*c*, and 620*d* corresponding to four powered on illuminators.

In an example, the position of each of the glints 620*a*, 620*b*, 620*c*, and 620*d* relative to the pupil edge is computed from the first image 610. For instance, an X,Y coordinate system is defined. The origin of this coordinate system can be at the bottom left corner of the image 610, at a particular pupil reference point 630 (e.g., at the utmost right point on the pupil edge 618, as shown in FIG. 6 with the cross illustration), or at some other point in the first image 610. The X,Y location of each glint in the image 610 is computed based on the number of pixels relative to the origin. If the origin is different from the pupil reference point 630, the relative position of a glint to the pupil edge 618 can be computed as the difference between the X,Y location of the glint and the X,Y location of the pupil reference point 630. Accordingly, the relative position can be expressed as a glint-to-pupil edge vector (or distance and direction). FIG. 6 illustrates the relative position between the glint 620*c* and the pupil edge 618 with the glint-to-pupil edge vector 640.

The second image 650 may also show the user eye 612, including the iris 614, the pupil 616, the pupil edge 618, and the glints 620*a*, 620*b*, 620*c*, and 620*d* corresponding to the same four powered-on illuminators. However, because the second image 650 is generated at a different time than the first image 610, the user eye 612 may have moved relative to the illuminators and/or camera(s). Hence, at least the positions of some or all of the glints 620*a*, 620*b*, 620*c*, and 620*d* may have shifted. As illustrated in FIG. 6, the glint 620*c* may have moved to the right in the second image 650 relative to the first image 610 and this glint 620*c* is now closer to the pupil edge 618 (as shown with a shorter glint-to-pupil edge vector 660). The positions of these glints 620*a*, 620*b*, 620*c*, and 620*d* and, as needed, the position of the pupil reference point 630 may also be computed from the second image 650 to then derive the relative position of each of the glints 620*a*, 620*b*, 620*c*, and 620*d* to the pupil edge 618 in the second image 650.

Based on the two images 610 and 650 (and, optionally, other images similarly generated), a prediction 690 can be made of the next positions of the glints 620*a*, 620*b*, 620*c*, and 620*d* relative to the pupil edge 618. In other words, if a third image were to be generated with the same set of powered-on illuminators, the positions of the glints 620*a*, 620*b*, 620*c*, and 620*d* and, as needed, the position of the pupil reference point 630 in the third image are predicted given their corresponding positions in the first and second images 610 and 650 (and, optionally, the other images similarly generated). FIG. 6 shows the predicted glint positions with elements 692*a*, 692*b*, 692*c*, and 692*d* and the predicted pupil reference point position with element 694. For each glint, its relative position to the pupil edge 618 can be derived from these predicted positions and used to predict whether the glint is about to fall on the pupil edge or move close to the pupil edge within a threshold.

Hence, glints can be detected in different images generated at different points in time. The detection can include matching the glints in the different images, as further illustrated in FIG. 7, and tracking their relative positions to a pupil edge, as further illustrated in FIG. 8. Given their relative positions in these images, predicted relative positions are generated to then determine whether a glint is about to fall on the pupil edge, move close to the pupil edge within a threshold and control the power states of the illuminators.

Figure 7:
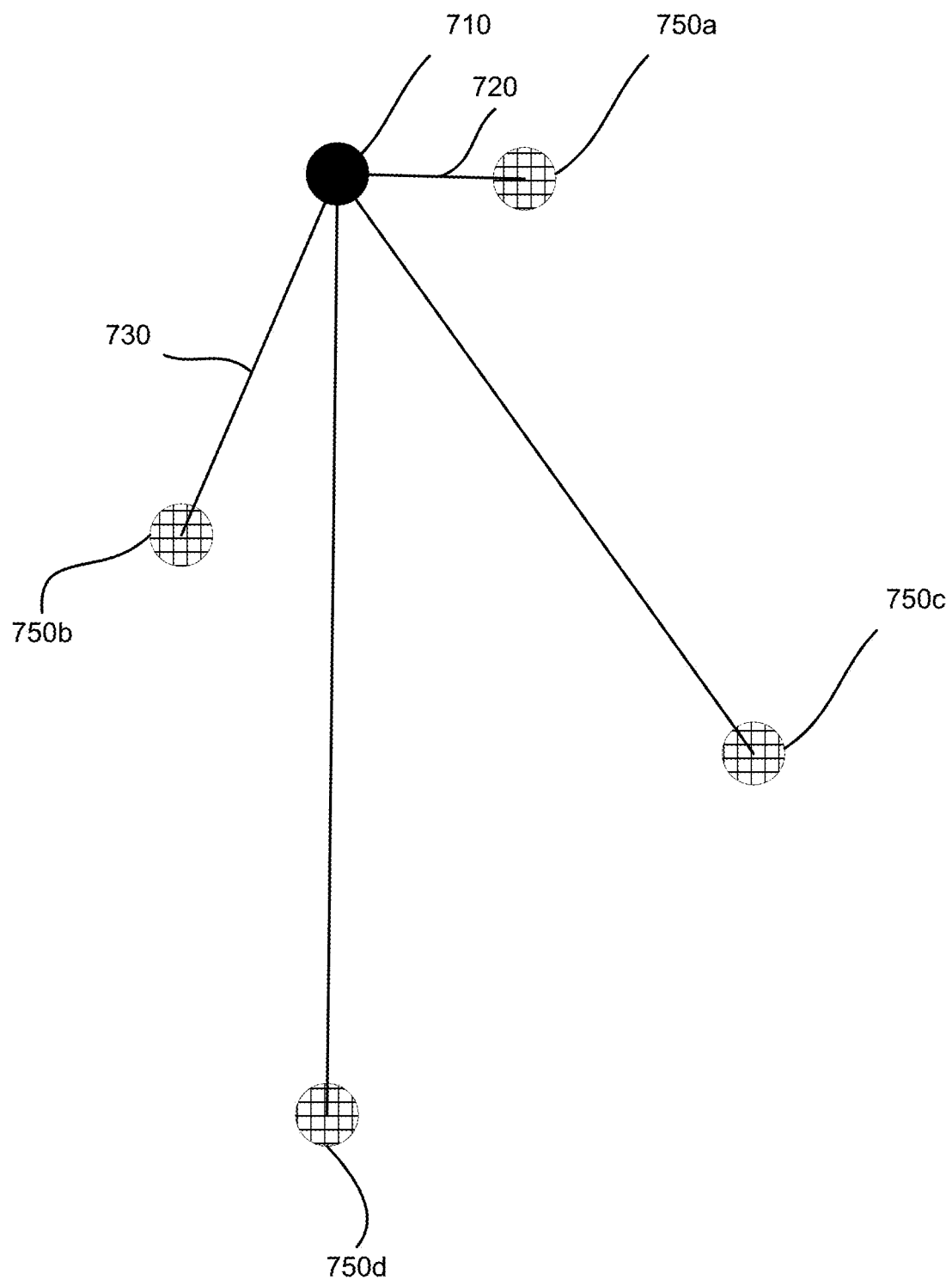
FIG. 7 illustrates an example of glint matching between images, according to an embodiment of the present disclosure.

FIG. 7 illustrates an example of glint matching between images, according to an embodiment of the present disclosure. Generally, a first plurality of glints are shown in a first image and a second plurality of glints are shown in a second image. Pattern matching may be used to identify glint patterns shown in the images and determine correspondences between the glints based on the glint patterns.

As illustrated in FIG. 7, the pattern matching may involve comparing positions of the glints in the images. In particular, a first glint 710 may be shown in the first image and its position in that image may be computed. The second image may show second glints 750*a*, 750*b*, 750*c*, and 750*d* and their positions may also be computed. To match the first glint 710 with one of the second glints 750*a*, 750*b*, 750*c*, and 750*d*, each second glint may be set as a potential match. The distance between the first glint 710 and each potential match is measured given the corresponding positions computed from the two images. The potential match corresponding to the smallest distance or to a distance smaller than a threshold, is selected as the match of the first glint 710 in the second image.

To illustrate, the first glint 710 is selected from the from the first plurality of glints shown in the first image. A second glint 750*a* and a third glint 750*b* are selected from the second plurality of glints shown in the second image as potential matches to the glint. Based on the first image and the second image (e.g., based on the relative positions of the selected glints in the respective images), a first distance 720 between the first glint 710 and the second glint 750*a* and a second distance 730 between the first glint and the third glint 750*b* are computed. Based on a comparison of the first distance 720 and the second distance 730, the second glint 750*a* is selected as matching the first glint 710 (e.g., because the first distance 720 is the smallest of the two distances 720 and 730).

Figure 8:
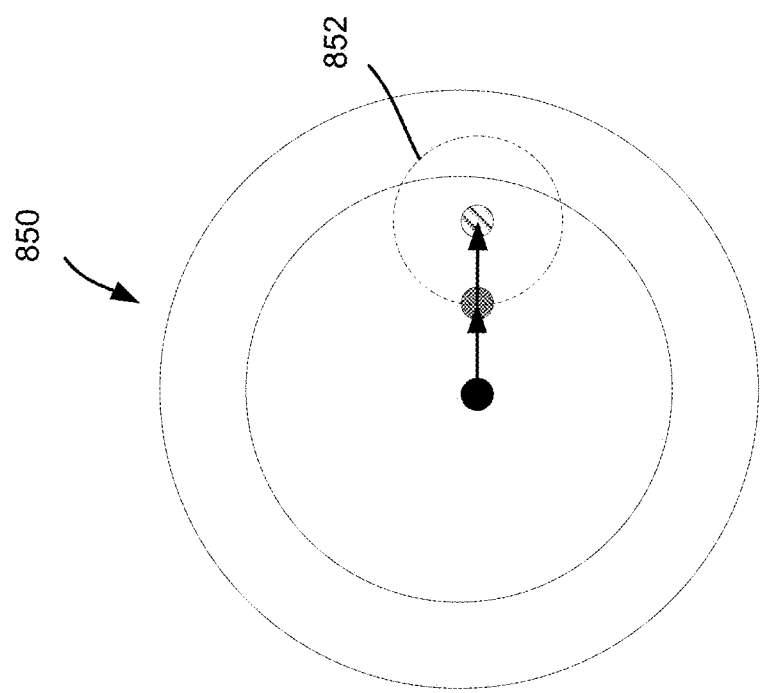
FIG. 8 illustrates examples of predicting a position of a glint relative to a pupil edge and determining whether the glint should be removed, according to an embodiment of the present disclosure.
Figure 8:
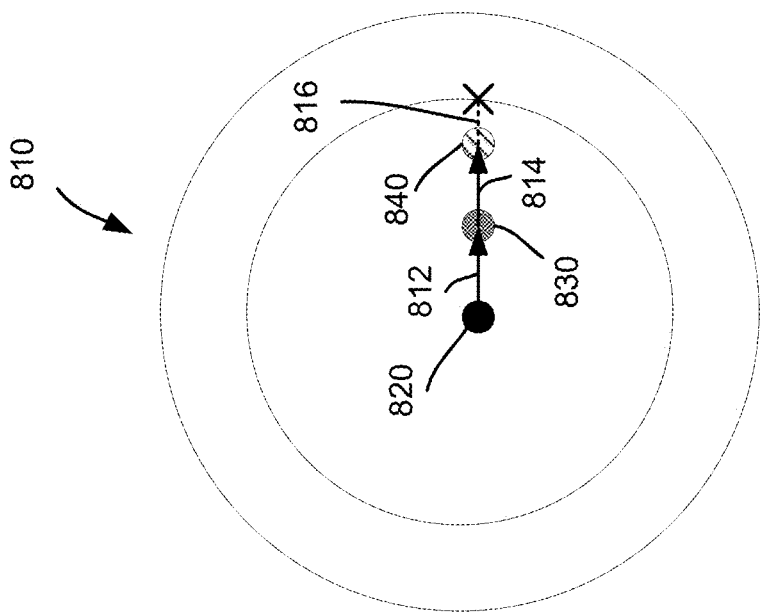

FIG. 8 illustrates examples of predicting a position of a glint relative to a pupil edge and determining whether the glint should be removed, according to an embodiment of the present disclosure. In a first example 810, illustrated on the left side of FIG. 8, vectors and a threshold distance are used. In a second example 850, illustrated on the right side of FIG. 8, vectors and an accuracy margin are used. Each of these two examples 810 and 850 is further described herein next.

In the first example 810, the predicted position of a glint is determined as a function of the distance and direction between its first and second positions determined from first and second images. This can include generating a glint vector originating at the first position and ending at the second position, and then repositioning this vector to originate at the second position. The predicted position would be the end of the glint vector originating from the second position.

As illustrated, a first position 820 of a glint is computed from a first image. A second position 830 of the glint is computed from a second image. A distance and a direction between the first position 820 and the second position 850 of the glint are determined and can be expressed as a glint vector 812. A third position 840 of the glint is estimated based on the distance and the direction, where this third position 840 corresponds to a predicted position of the glint (e.g., an estimated position of this glint in a third image to be generated with a powered-on illuminator corresponding to the glint). In particular, the third position 840 is set to be at the same equal distance and direction from the second position 830 (or some other function of the distance and direction depending, for instance, on the velocity of the eye saccade). For instance, the glint vector 812 can be repositioned to originate from the second position 830 (FIG. 6 illustrates this repositioning with glint vector 814). The end of the glint vector 814 is the third position 840.

To determine whether the illuminator corresponding to the glint should be turned off, the third position 840 may be compared to the pupil edge, such as a to a point on the pupil edge (e.g., a particular pupil edge reference point or the closest point on the pupil edge). This point may also have been predicted based on its positions computed from the first and second images. That relative position may include a predicted distance 816 between the third position and the pupil edge. If the third position is within a threshold distance from the pupil edge (e.g., the predicted relative position between the glint and the pupil edge, or, similarly, the predicted distance 816 between the glint and the point on the pupil edge is smaller or equal to the threshold distance), a determination is made that the illuminator should be powered off. Otherwise, the power on state of the illuminator may not be changed.

In an example, the threshold distance is a predefined value available from memory. In another example, the threshold distance includes a dynamic value defined based on the distance between the first position 820 and the second position 830 of the glint. For instance, the larger that distance is, the greater and possibly faster the eye movement is (e.g., the higher the velocity of the eye saccade is), and the larger the dynamic value becomes to avoid the potential of the glint arriving to or crossing the pupil edge.

In the second example 850, the predicted position of a glint is determined by considering an accuracy margin. In particular, the third position of the glint is predicted as described herein above in connection with the first example 810. Rather than using a distance between the third position and the pupil edge and a threshold distance, a circle 852 is generated. The circle 852 is centered at the third position. Its radius is defined based on the distance between the first and second positions (e.g., is set equal to that distance or as a function of that distance). If the circle intersects with the pupil edge, a determination is made that the illuminator should be powered off. Otherwise, the illuminator may be kept in the power on state.

Figure 9:
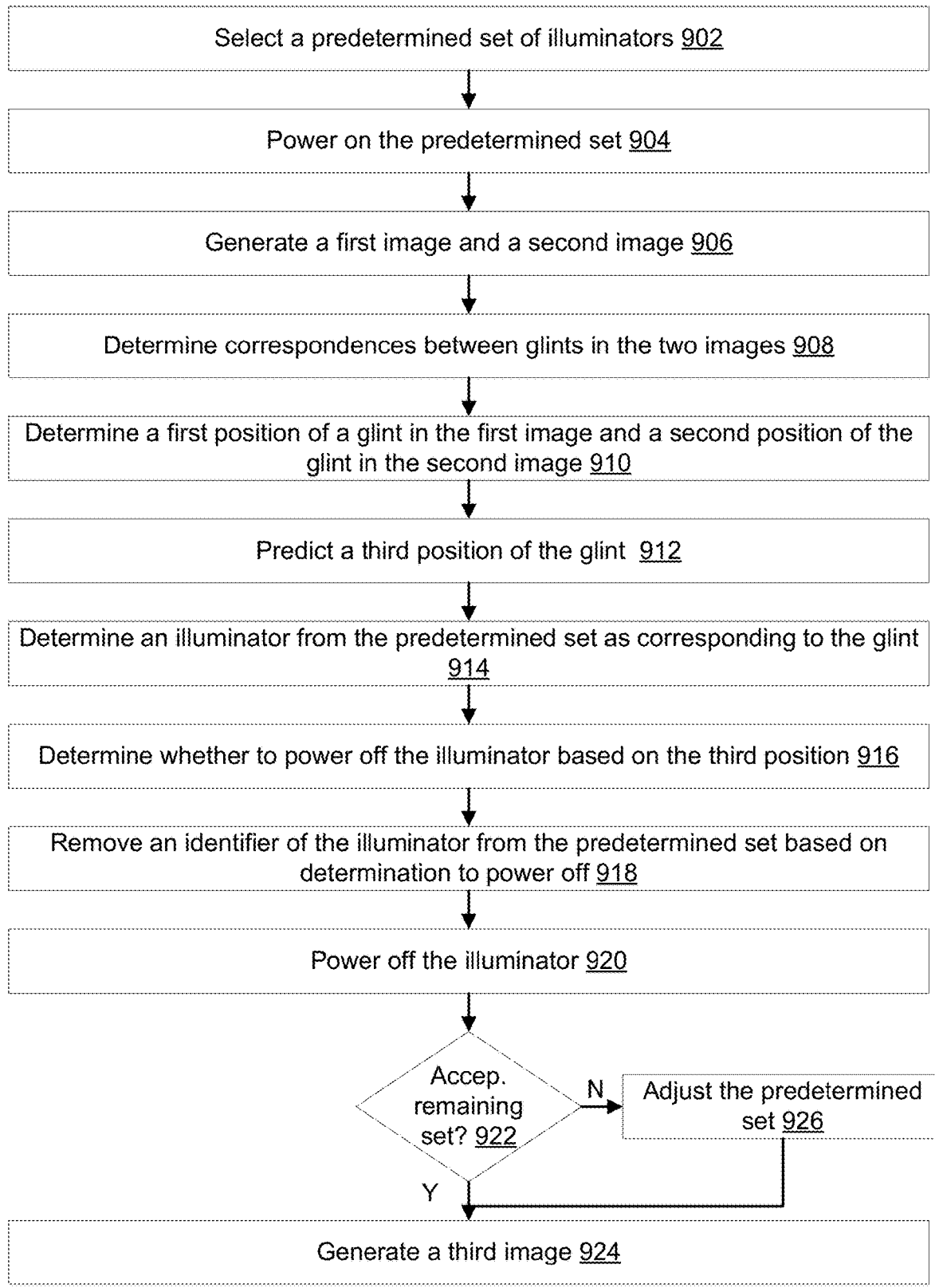
FIG. 9 illustrates an example of a flow for controlling light sources based on predicted glint positions relative to a pupil edge, according to an embodiment of the present disclosure.

FIG. 9 illustrates an example of a flow for controlling light sources based on predicted glint position relative to a pupil edge, according to an embodiment of the present disclosure. In the interest of clarity of explanation, the example flow is described in connection with a single glint and two images. However, the example flow similarly applies to tracking and predicting the relative positions of multiple glints shown in multiple images. The example flow can be implemented on an eye tracking system, such as the ones described in connection with FIGS. 1-5. Instructions for performing operations of the flow can be stored as computer-readable instructions on one or non-transitory computer-readable media of the eye tracking system. As stored, the instructions represent programmable modules that include code or data executable by one or more processors of the eye tracking system. The execution of such instructions configures the eye tracking system to perform the specific operations shown in the figure and described herein. Each programmable module in combination with at least one of the one or more processors represents a means for performing a respective operation(s). While the operations are illustrated in a particular order, it should be understood that no particular order is necessary and that one or more operations may be omitted, skipped, and/or reordered.

The example flow starts at operation 902, where the eye tracking system selects a predetermined set of illuminators.

In an example, different factors can be used for the selection and this set can be a subset from available illuminators. These factors include preferred minimum and maximum numbers of illuminators (e.g., at least two illuminators and no more than ten illuminators), a distribution of the illuminators from the available illuminators (e.g., selecting illuminators that are not too close to each other—the distance between two adjacent illuminators being larger or equal to a preferred distance), a particular pattern of illuminators (e.g., illuminators that form corners of a square or some other geometric shape), among other factors. As further illustrated in connection with remaining operations of the example flow, the predetermined set can be updated to remove and add illuminators based on the glint tracking. Hence, other usable factors can relate to the glint tracking, as further described herein below.

At operation 904, the eye tracking system powers on the predetermined set. In an example, a controller of the eye tracking system controls the power states of the illuminators and can switch power on to the illuminators from one or more power sources. As needed, the controller can also switch off power to the remaining illuminators that do not belong to the predetermined set.

At operation 906, the eye tracking system generates a first image and a second image showing at least a portion of a user eye illuminated by the predetermined set of illuminators. In an example, the first image is generated before the second image and each of these two images is generated while the predetermined set of illuminators is powered on.

At operation 908, the eye tracking system determines correspondences between glints in the two images. In an example, the eye tracking system identifies a glint in the first image and matches this glint with a glint shown in the second image. The matching can use glint patterns as described herein above in connection with FIG. 7.

At operation 910, the eye tracking system determines a first position of the glint in the first image and a second position of the glint in the second image. In an example, each of the first position and the second position is relative to a pupil edge. These positions may be computed by using a common coordinate system in both images. In addition, the positions of the pupil edge can be determined in the two images to derive the first relative position and the second relative position.

At operation 912, the eye tracking system predicts a third position of the glint relative to the pupil edge based on the first position and the second position. In an example, the next position of the glint and the next position of the pupil edge are predicted given their positions in the two images. The third position can be derived as the predicted relative position between the glint and the pupil edge based on their predicted positions.

At operation 914, the eye tracking system determines, from the predetermined set, an illuminator that corresponds to the glint. In an example, the illuminators in the predetermined set form an illuminator pattern. The glints detected in the first image or in the second image, or the averaging of the glints between the two images (e.g., if the glint moved between the two images between the two positions, an average of the two positions is used for that glint; similar average positions can also be used for the remaining glints) form a glint pattern. The eye tracking system may match the illuminator pattern and the glint pattern to identify the correspondences between the illuminators from the predetermined set and the glints and, accordingly, identify the particular illuminator that corresponds to the glint.

At operation 916, the eye tracking system determines whether to power off the illuminator based on the third position. In an example, the third position is used to determine a predicted distance between the predicted next position of the glint and the predicted next position of the pupil edge. This predicted distance may be compared to a threshold distance, as illustrated in the first example 810 of FIG. 8. If the predicted distance is less than the threshold distance, a determination is made that the illuminator should be powered off, and the example flow proceeds to operation 918. Otherwise, the illuminator should not be powered off, and some of the previous operations of the example flow may be performed for the remaining glints that were detected in the images. In another example, a circle is generated based on this predicted distance and is centered at the predicted next position of the glint. A determination is made of whether the circle interests the pupil edge (e.g., as also predicted), as illustrated in the second example 850 of FIG. 8. Here also, if an intersection exists, a determination is made that the illuminator should be powered off, and the example flow proceeds to operation 918. Otherwise, the illuminator should not be powered off, and some of the previous operations of the example flow may be performed for the remaining glints that were detected in the images.

At operation 918, the eye tracking system has determined that the illuminator corresponding to the glint should be powered off. The eye tracking system removes an identifier of the illuminator from the predetermined set based on the determination to power it off. In this way, the eye tracking system may track which illuminator(s) should be powered off.

At operation 920, the eye tracking system powers off the illuminator based on the determination to power it off and/or the removal of its identifier from the predetermined set. In an example, the controller of the eye tracking system controls the power state of the illuminator and switches the power off from the one or more power sources to the illuminator. This operation can be performed individually for the illuminator. Alternatively, the eye tracking system may determine whether other illuminators should be powered off and other ones should be powered on, as further described in connection with the next operations, to then collectively control the power to these illuminators.

At operation 922, the eye tracking system determines whether the remaining set of powered-on illuminators is acceptable. In an example, the eye tracking system determines the remaining set from the predetermined set upon removal of the identifier of the illuminator and, optionally, the removal of identifiers of other illuminators that should also be powered off. The eye tracking system may use different factors to determine whether this remaining set is acceptable. These factors include, for instance, a size of the remaining set (e.g., the total number of remaining illuminators; if that total number is less than the minimum number, a determination is made that the remaining set is unacceptable), a distribution of illuminators from the remaining set (e.g., distances between the illuminators from the remaining set; if the distance between two adjacent remaining illuminators is too large, a determination is made that the remaining set is unacceptable), or a pattern of the illuminators (e.g., if the pattern forms a geometric shape complex to match to a glint pattern or the pattern cannot be accurately matched to the glint pattern, a determination is made that the remaining set is unacceptable). If the determination is that the remaining set is acceptable, operations 924 can follow operation 922. Otherwise, operation 926 can follow operation 922.

At operation 924, the eye tracking system generates a third image. In an example, this image is generated with the illuminator powered off, such that the glint would no longer be shown in the third image. In addition, if other illuminators from the predetermined set are powered off, their glints will also no longer be shown. Conversely, if additional illuminators are powered on (to adjust the predetermined set, per operation 926), their glints would be shown in the third image. The example flow would be repeated to continue the tracking of the glints and the controlling of the illuminators.

At operation 926, the eye tracking system adjusts the predetermined set. In an example, beyond removing identifiers of illuminators that should be powered off, identifiers of other illuminators can be added to the predetermined set. Once the adjustment is complete, the controller of the eye tracking system controls the power state of the illuminators in the adjusted set and, as applicable, switches the power on from the one or more power sources to these illuminators (and switching the power off to the illuminators not identified in the adjusted set). In an example, the eye tracking system determines additional illuminators that were excluded from the predetermined set of illuminators, selects one or more of these additional illuminators, adds their identifiers to the adjusted set, and powers them on. An additional illuminator can be selected based on at least one or more of a distance or a direction between the first position and the second position of the glint. For instance, if the glint moved to the right in the second image relative to the first image, the additional illuminator is selected be the one on the left of the illuminator (that corresponds to the glint and that was determined to be powered off), such that the new glint corresponding to the additional illuminator will likely fall inside the pupil. In another example, rather than adjusting the predetermined set, this set is emptied and the factors described herein above in connection with operation 902 are re-used to select a new predetermined set. In this example, any illuminator determined that it should be powered off can be excluded from the selection of the new predetermined set.

The disclosure has now been described in detail for the purposes of clarity and understanding. However, it will be appreciated that certain changes and modifications may be practiced within the scope of the appended claims.

The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to, transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, using machines, hardware, software, firmware, middleware, microcode, hardware description languages, or any combination thereof. When implemented in software, firmware, middleware or microcode, the program code or code segments to perform the necessary tasks may be stored in a machine-readable medium. A processor or processors may perform the necessary tasks.

As used herein, the phrase "a first thing based on a second thing," and the like, may mean that the first thing is based solely on the second thing, or that the first thing is based on the second thing as well as one or more additional things.

What is claimed is:

1. A method for tracking a user eye, the method implemented by an eye tracking system and comprising:

generating a first image and a second image showing at least a portion of the user eye illuminated by a predetermined set of illuminators;

determining a first position of a glint in the first image and a second position of the glint in the second image, wherein each of the first position and the second position is relative to a pupil edge;

predicting a third position of the glint relative to the pupil edge based on the first position and the second position;

determining, from the predetermined set, an illuminator that corresponds to the glint; and determining, based on the third position, whether to power off the illuminator to generate a third image of at least the portion of the user eye;

wherein predicting the third position comprises:
  determining a distance and a direction between the first position and the second position of the glint; and
  estimating the third position of the glint based on the distance and the direction, and wherein determining whether to power off the illuminator comprises:
  determining that the illuminator should be powered off based on the third position being within a threshold distance from the pupil edge.

2. The method of claim 1, wherein the first image shows a first plurality of glints and the second image shows a second plurality of glints, wherein positions of each one of the first plurality of glints relative to the pupil edge are determined in the first image, and wherein positions of each one of the second plurality of glints relative to the pupil edge are determined in the second image.

3. The method of claim 2, further comprising: matching the glint from the first plurality of glints shown in the first image to a second glint from the second plurality of glints shown in the second image based on glint patterns in the first image and the second image.

4. The method of claim 2, further comprising:
  selecting the glint from the first plurality of glints shown in the first image;
  selecting the second glint and a third glint from the second plurality of glints shown in the second image as potential matches to the glint;
  computing, based on the first image and the second image, a first distance between the glint and the second glint and a second distance between the glint and the third glint;
  selecting the second glint from the second plurality of glints as matching the glint from the first plurality of glints based on a comparison of the first distance and the second distance.

5. The method of claim 1, wherein determining whether to power off the illuminator comprises:
  determining that the illuminator should be powered off based on a comparison between a threshold distance and the third position of the glint relative to the pupil edge.

6. The method of claim 5, wherein the threshold distance comprises a dynamic value defined based on a distance between the first position and the second position of the glint.

7. The method of claim 1, further comprises:
  removing an identifier of the illuminator from the predetermined set of illuminators based on a determination that the illuminator should be powered off;
  based on removal of the identifier of the illuminator from the predetermined set, determining a remaining set of illuminators from the predetermined set; and
  determining whether the remaining set is acceptable for eye tracking.

8. The method of claim 7, wherein determining whether the remaining set is acceptable is based on at least one or more of: a size of the remaining set, a distribution of illuminators from the remaining set, or distances between the illuminators from the remaining set.

9. The method of claim 7, further comprising:
  based on determining that the remaining set is unacceptable, determining additional illuminators excluded from the predetermined set of illuminators;
  selecting an additional illuminator from the additional illuminators; and
  powering on the additional illuminator.

10. The method of claim 9, wherein the additional illuminator is selected based on at least one or more of a distance or a direction between the first position and the second position of the glint.

11. The method of claim 7, further comprising:
  based on determining that the remaining set is unacceptable, selecting a new predetermined set of illuminators, the new predetermined set excluding the illuminator; and
  powering on the new predetermined set of illuminators to generate the third image.

12. The method of claim 1, further comprising:
  predicting the pupil edge in the third image based on the first image and the second image, wherein the third position of the glint is predicted relative to the predicted pupil edge in the third image.

13. An eye tracking system comprising:
  one or more processors; and
  one or more non-transitory computer-readable media storing instructions that, upon execution by the one or more processors, cause the eye tracking system to perform operations comprising:
  generating a first image and a second image showing at least a portion of a user eye illuminated by a predetermined set of illuminators;
  determining a first position of a glint in the first image and a second position of the glint in the second image, wherein each of the first position and the second position is relative to a pupil edge;
  predicting a third position of the glint relative to the pupil edge based on the first position and the second position;
  determining, from the predetermined set, an illuminator that corresponds to the glint; and
  determining, based on the third position, whether to power off the illuminator to generate a third image of at least the portion of the user eye;
  wherein predicting the third position comprises:
  determining a distance and a direction between the first position and the second position of the glint; and
  estimating the third position of the glint based on the distance and the direction, and wherein determining whether to power off the illuminator comprises:
  determining that the illuminator should be powered off based on the third position being within a threshold distance from the pupil edge.

14. The eye tracking system of claim 13, wherein determining whether to power off the illuminator comprises:
  determining that the illuminator should be powered off based on a comparison between a threshold distance and the third position of the glint relative to the pupil edge.

15. The eye tracking system of claim 14, wherein the threshold distance comprises a dynamic value defined based on a distance between the first position and the second position of the glint.

16. One or more non-transitory computer-readable media storing instructions that, upon execution by one or more processors, cause an eye tracking system to perform operations comprising:
  generating a first image and a second image showing at least a portion of a user eye illuminated by a predetermined set of illuminators;
  determining a first position of a glint in the first image and a second position of the glint in the second image, wherein each of the first position and the second position is relative to a pupil edge;

predicting a third position of the glint relative to the pupil edge based on the first position and the second position;

determining, from the predetermined set, an illuminator that corresponds to the glint; and determining, based on the third position, whether to power off the illuminator to generate a third image of at least the portion of the user eye;

wherein predicting the third position comprises:

determining a distance and a direction between the first position and the second position of the glint; and estimating the third position of the glint based on the distance and the direction, and wherein determining whether to power off the illuminator comprises:

determining that the illuminator should be powered off based on the third position being within a threshold distance from the pupil edge.

17. The one or more non-transitory computer-readable media of claim 16, wherein determining whether to power off the illuminator comprises:

determining that the illuminator should be powered off based on a comparison between a threshold distance and the third position of the glint relative to the pupil edge, wherein the threshold distance comprises a dynamic value defined based on a distance between the first position and the second position of the glint.

18. The one or more non-transitory computer-readable media of claim 16, wherein predicting the third position comprises:

determining a distance and a direction between the first position and the second position of the glint; and estimating the third position of the glint in the third image based on the distance and the direction.

* * * * *